3,388,186
CARBOXY TERMINATED GRAFT COPOLYMERS OF AMINO-CARBOXYLIC ACIDS OR LACTAMS ON ACRYLIC COPOLYMERS
Raymond J. Kray, Berkeley Heights, and Richard J. Bellet, Mountain Lakes, N.J., assignors to Allied Chemical Corporation, New York, N.Y., a corporation of New York
No Drawing. Filed Mar. 2, 1965, Ser. No. 436,685
9 Claims. (Cl. 260—857)

ABSTRACT OF THE DISCLOSURE

This invention relates to graft polymers having a backbone chain containing recurring ethylenic units and side chains containing carboxy terminated polyamide groups.

Polyamide resins, such as are known under the generic name nylon, are noted for a number of their properties such as hardness, high tensile strength, toughness, and rigidity.

The drawback of such resins is their generally high rigidity resulting in low impact strength, especially at low temperatures. In the past, it has been proposed to combine polyamides with other hydrocarbon polymers, the latter acting as a plasticizer for the polyamide, to obtain less rigid and more flexible polyamides. It was found that while an improvement of these properties could be accomplished at room temperature, at low temperatures a deterioration of properties was observed compared to the properties of the unplasticized product. According to another proposed method, polyamides were grafted onto a hydrocarbon polymer backbone, the monomeric units of the hydrocarbon backbone having acid functional groups pendant from the backbone, so that a polyamide branch was grafted onto every monomeric unit of the polymer backbone through the pendant functional groups. Due to the large number of polyamide sidechains grafted onto the backbone, i.e. the high degree of branching, hydrogen bonding occurs between adjacent polyamide branches, thereby increasing the melt viscosity of the composition and making the thermoforming of the material difficult or impossible.

Homopolymers and interpolymers of simple hydrocarbons, such as of aliphatic olefins, alkenes, etc., are well known, and are generally inexpensive, popular materials for a variety of uses. The usefulness of such popular polymers as polyethylene, polypropylene, polyacrylates, etc., is limited, however, by their generally low mechanical strength.

It is an object of the invention to provide improved polyamide compositions and methods for making the same.

It is another object of the invention to provide novel hydrocarbon polymer-based compositions having improved mechanical strength, and methods for making the same.

The graft polymer of the invention has a copolymeric backbone base of recurring ethylenic units of not more than 10 carbon atoms, and being of either one of the following formulas:

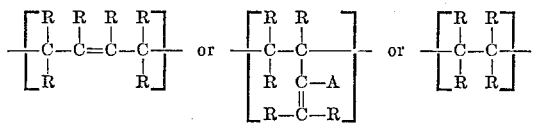

wherein each R can be independently hydrogen, halogen, and substituted or unsubstituted alkyl radical of up to 8 carbon atoms. The backbone copolymer also contains recurring alkylene units of a maximum of 10 carbon atoms, the alkylene units each bearing a pendant organic radical having as a substituent an organic acid radical or ester or salt of such acid radical. The polymer contains polyamide grafts, having consecutively recurring units of the formula:

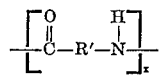

wherein R' is a polymethylene diradical of at least 5 methylene groups and $x$ is a cardinal number of at least 2, the terminal nitrogen of each graft being attached to one of said pendant radicals.

In accordance with the method of the invention the graft polymer is prepared by polymerizing in the melt, at active sites to be defined below to form a grafted polyamide containing at least 6 carbon atoms, at least one compound being a member of the group consisting of monoamino-monocarboxylic acids and esters, amides, or lactams of monoamino-monocarboxylic acids, the polymerization being conducted in the presence of a copolymer of, as major co-monomer, a polymerizable ethylenically unsaturated material of a maximum of 10 carbon atoms and being of the formula:

wherein each R is independently a member of the group consisting of hydrogen, halogen, alkyl radicals of up to 8 carbon atoms, and as minor co-monomer, a monofunctional organic acid, its ester or salt to provide an active site for grafting a polyamide.

The relative proportions of the copolymer backbone material and the polyamide can vary between large limits. Preferably the concentration of said copolymer is between 2 and 90% by weight of the graft polymer. When the polyamide predominates, basically a high impact strength plasticized polyamide compoistion is provided. On the other hand, when the hydrocarbon copolymer predominates, the resin is then of a different type, being an upgraded version of the polymer represented by the principal hydrocarbon component of the copolymer. It is to be understood that the term "copolymer" is intended to include copolymers of two or more co-monomers.

The definite structure of the polymerized compositions of the invention is not fully known; it is known, however, that the active acid or ester groups of the minor co-monomer component of the copolymer provide the sites for the polyamide side-chain grafts becoming attached to the backbone.

It is believed that the frequency of the recurring active sites in the copolymer backbone should be kept low to provide sufficient distance between adjacent polyamide grafts, as well as to prevent the percentage of the number of grafts per copolymer backbone chain from becoming too large. This appears important to prevent interconnection, by hydrogen bonding, between adjacent grafts, which would result in increased viscosity and difficulty in thermoforming. It is believed that advantageously the co-monomer-based composition of the copolymer should contain between 1 and 20 mol percent of the minor co-monomer. It is not known whether, under general processing conditions, all active sites will be populated with a grafted-on polyamide sidechain, neither is the number of monomeric units in each polyamide sidechain known. It is for this reason that, depending on the type of composition according to the invention, a greater or lesser amount of ungrafted polyamide or substantially graft-free chains of backbone copolymer can also be present in the composition, dispersed as a blend.

Substituted as well as unsubstituted ethylenically unsaturated materials can be used as the major co-monomer for the backbone copolymer in accordance with the invention. In the following formula of the major co-monomer

each R can be, independently from each other, one of a number of substituted or unsubstituted organic radicals, or hydrogen. R can stand for alkyl radicals of up to 8 carbon atoms, and in the case of using such substitutions suitable co-monomers such as butene-1, heptene-1, decene-1, etc. can be formed. By similar substitutions for R, major co-monomers, such as ethylene, propylene, butene, and the like can be provided. R can also stand for an alkyl substitution rendering the principal co-monomer a cycloaliphatic material such as cyclopentene and cyclohexene. The major co-monomer should not contain amine and amide type nitrogen substitutions which would interfere with the grafting reaction, but materials with nitro-type nitrogen substitutions can be satisfactorily used. Halogenated materials such as tetrafluoroethylene, conjugated dienes, such as butadiene-1,3; 2-chloro butadiene-1,3 (chloroprene); and 2,3-dimethylbutadiene-1,3, etc., can also be satisfactorily employed. Of course, substitutions for each R independently can be made. Aromatics if used as the major co-monomer of the backbone polymer would impart rigidity and thus produce unsatisfactory impact strength.

The minor acid, ester, or salt-group-providing unsaturated co-monomer which contributes the active linking site, contains preferably substituent carboxy radicals, which term includes acid radicals and derivatives thereof; and should be a monofunctional compound, such as acrylic acid, an alkyl acrylate, methacrylic acid, or an alkyl methacrylate, or mixtures thereof. Copolymers useful as a backbone in the invention, are generally well known by themselves and are commercially available low-cost materials.

The following types of amino compounds can be used for the grafting of the sidechains:

monoamino-monocarboxylic acids, such as e-aminocaproic acid; 11-aminoundecanoic acid; 12-aminododecanoic acid.
esters, amides and lactams of monoamino-monocarboxylic acids, such as e-caprolactam; ethyl e-aminocaproate; e-aminocaproamide; lauryl lactam; ethyl-11-amino undecanoate; 11-aminoundecanoamide.

and a number of possible varieties of mixtures of the above type of materials, many of in whose polymers are known under various nylon designations.

A polyamide-forming hydrolytic polymerization process suitable for carrying out the present invention is described, for instance in U.S. Patent No. 3,090,773 (for polycaprolactam).

In the present invention, such process results in grafting e-caprolactam onto a backbone copolymer, e.g. of ethylene and ethyl acrylate. Aminocaproic acid or low polymer thereof formed from the lactam and water can, for example, react with the substituent ester radical liberating ethyl alcohol and forming a pendant amido radical having a terminal carboxylic acid radical. The terminal carboxylic acid radical can catalyze ring opening of caprolactam and growth of polycaprolactam graft branches from the backbone.

The following examples set forth the best method contemplated for carrying out the present invention, but the invention is not to be construed as being limited to all details of the examples. Parts and percentages are by weight, and temperatures are given in ° C., unless otherwise designated. The tests were made by the following standard procedures:

notched izod impact strength ASTM test No. D-256-56
ultimate elongation (UE) and ASTM test No. D-638-58T yield elongation (YE)

The test samples intended for room temperature notched izod impact strength measurement were held at 23° C. and 50% relative humidity for 3 days prior to testing.

Examples I–III

In the following examples e-caprolactam monomer and ethylene-ethyl acrylate copolymer have been used, the copolymer containing 18% ethyl acrylate and having a number average molecular weight of 17,000, as determined on a Vapor Phase Osmometer, Model No. 302 from Mechrolab, Inc. The copolymer is sold by Union Carbide under the trademark DPDB-6169. In Examples I–III, the copolymer at concentrations of 5%, 10%, and 25%, respectively, was dispersed in molten caprolactam at 255°. The reaction mixture was then heated at that temperature under nitrogen for 12 hours and then extruded in a 1 inch diameter extruder designed for the extrusion of nylon, at 50 r.p.m. at a temperature between 242° and 250°, and a pressure between 850 and 1100 p.s.i.g. Subsequently the material was quenched in water and pelletized. The pellets were extracted with water at 90° for 8 hours, reducing down to about 1–2% the residual unreacted caprolactam and water-soluble low polymers thereof present in equilibrium with the polymer. The extracted pellets were dried under vacuum at 80° for 24 hours to a moisture content of 0.2%, and then molded into standard micro-tensile bars for testing.

The graft polymer thus prepared contained recurring units of the following formula:

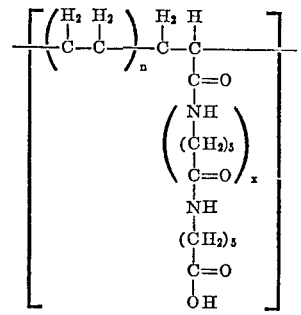

wherein $n$ is an integer from 0 up, and $x$ is a cardinal number being at least 1.

As control, a number of samples were prepared by blending nylon 6 polymer (polycaprolactam), controls A and B containing 10 and 25% respectively of the polyethylene-ethyl acrylate copolymer of Examples I–III. In preparing the blended controls, the pellets of the copolymer were tumbled, until thoroughly mixed, with polycaprolactam sold by Allied Chemical Corp. for general molding use under the trademark PLASKON 8200 and having a number average molecular weight of 20,000, as determined by end group analysis. The polycaprolactam before use, was extracted with water at 90° until containing between 1 and 2%-water extractables. The blend had a moisture content of 0.2%. Subsequently the mixture was extruded as in Examples I–III. The extruded material was quickly surface-quenched with water and pelletized still hot, and then injection molded into standard micro-tensile bars for physical testing in accordance with the tests above specified.

Control C was molten caprolactam polymerized as in Examples I–III, but instead of using the copolymer of Examples I–III, here 25% of an ethylene-propylene copolymer, sold by the Enjay Chemical Co. under the trademark EPR–404, which contained no functional groups was used. Control D was molten caprolactam polymerized in the presence of 10% of a copolymer of ethylene and vinyl acetate sold by the Union Carbide Corp. under the trademark DQDE–1868.

The results obtained on the samples prepared in accordance with the above are summarized in Table 1.

TABLE 1

|  | Impact strength, ft.-lbs./in. notch | | Elongation Percent | |
|---|---|---|---|---|
|  | 23° | −40° | UE | YE |
| Example I | 3.5 | 1.3 | 230 | 10 |
| Example II | 22.0 | 2.1 | 275 | 10 |
| Example III | 26.4 | 2.5 | 280 | 10 |
| Nylon 6 | 1.20 | 0.61 | 190 | 6.0 |
| Control A | 1.9 | 0.9 | 250 | 5.7 |
| Control B | 1.2 | 1.0 | 60 | 5 |
| Control C | 2.8 | 1.9 | 51 | 5 |
| Control D | 1.0 | 0.5 | 30 | 12 |

As it can be seen from the data in Table 2 showing the results obtained on controls C and D, no gross improvements were obtained by controls C and D.

Example IV

A graft copolymer was made in accordance with Examples I–III from 20 parts of the ethylene ethyl acrylate copolymer used therein, and from 80 parts caprolactam. By extraction in refluxing toluene over a 24 hour period less than 1% was found to be soluble. The ethylene-ethyl acrylate copolymer alone is soluble in toluene at 80° C.

The graft copolymer of the present example was then attempted to be dissolved in hot trifluoroethanol, a good solvent for polycaprolactam, and a maximum of 74% of the graft polymer was found to be soluble. An infra-red spectral analysis, of the remaining 26% indicated both polyethylene and amide in the absorption spectrum. This allows to conclude that only 74% of the product was polycaprolactam, while the remaining 26% is essentially a graft polymer containing, little, if any, ungrafted ethylene-ethyl acrylate copolymer.

Examples V–VII

In accordance with the processes of Examples I–III graft polymers were prepared containing 50, 65, and 80 parts e-caprolactam, respectively, the balance in each case being the copolymer of Examples I–III. The results of the strength measurements on the polymers of Examples V–VII are shown in Table 2. Control E refers to the copolymer of ethylene and ethyl acrylate by itself.

TABLE 2

|  | Izod impact strength, ft.-lbs./in. notch | | Elongation, percent | |
|---|---|---|---|---|
|  | 23° | −40° | UE | YE |
| Example V | (¹) | 21.0 | 130 | 130 |
| Example VI | (¹) | 4.5 | 280 | 130 |
| Example VII | 24.0 | 3.1 | 200 | 10 |
| Control E | (¹) | (¹) | 650 |  |

¹ No break.

Examples VIII–X

The process of Examples I–III was repeated by polymerizing 90% e-caprolactam in the case of Example VIII in the presence of an ethylene-ethyl acrylate copolymer having a number average molecular weight of 13,700 and containing 30% ethyl acrylate, the copolymer being sold by the Dow Chemical Co. under the trademark EA–3018. In the case of Example IX 98% e-caprolactam was polymerized in the presence of an ethylene-ethyl acrylate copolymer containing 20% ethyl acrylate and having a number average molecular weight of 12,000. This copolymer is sold by the Dow Chemical Co. under the trademark EA–2018. In Example X a copolymer of ethylene and acrylic acid, the copolymer having a carboxylic equivalent weight of 900 and a number average molecular weight of 40,000, sold by the Dow Chemical Co. under the trademark OX–3623.7 was used. 90% e-caprolactam was polymerized in the presence of 10% of this copolymer.

The strength results obtained in the case of the graft copolymers of Examples VIII–X are indicated in Table 3.

TABLE 3

|  | Izod impact strength, ft.-lbs./in. notch | | Elongation, percent | |
|---|---|---|---|---|
|  | 23° | −40° | UE | YE |
| Example VIII | 8.7 | 2.0 |  |  |
| Example IX | 5.1 | 1.9 | 180 | 10 |
| Example X | 4.8 | 2.6 | 150 | 10 |

Example XI

A graft polymer is prepared in accordance with the process of Example I, the total amount of starting materials being 90 parts of the copolymer of ethylene-ethyl acrylate of Example 1 and 10 parts e-caprolactam. First only about half of the ethylene copolymer is mixed with the entire amount of caprolactam until thoroughly blended in the melt. Thereafter the remainder of the copolymer is added and the blending is completed. The resulting graft polymer, compared to polyethylene, has increased tensile strength, hydrocarbon solvent resistance and dye receptivity along with decreased oxygen gas permeability.

We claim:
1. A method for preparing a graft polymer having carboxy terminated side chains which comprises hydrolytically polymerizing in the melt at a temperature of at least 225° C. a nitrogen-containing compound selected from the group consisting of e-aminocaproic acid, 11-aminoundecanoic acid, 12-aminododecanoic acid, e-caprolactam, ethyl-e-aminocaproate, e-aminocaproamide, lauryl lactam, ethyl-11-aminoundecanoate and 11-aminodecanoamide, said polymerization being carried out in the presence of (1) at least one member of the group consisting of water and e-aminocaproic acid; and (2) a copolymer of an ethylenically unsaturated major comonomer of the formula

wherein R is independently selected from the group consisting of hydrogen, halogen and alkyl radicals of up to 8 carbon atoms and a minor comonomer selected from the group consisting of acrylic acid, methacrylic acid and esters and salts of said acids, said minor comonomer being present in an amount equal to between 1 mol percent and 20 mol percent of the total amount of comonomers; and said acid, ester or salt groups of the minor comonomer serving as active sites onto which said nitrogen-containing compound graft polymerizes, thereby forming on said copolymer side chains of the formula

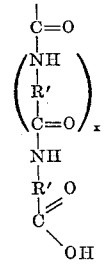

wherein R' is a polymethylene diradical and x is a cardinal number of at least 1, said copolymer constituting between 2 and 90% by weight of the graft copolymer.

2. The method of claim 1 wherein said minor comonomer is selected from the group consisting of acrylic acid, alkyl acrylate, methacrylic acid and alkyl methacrylate.

3. The method of claim 1 wherein said nitrogen-containing compound is e-caprolactam, R' has the formula

—CH₂(CH₂)₃CH₂— and said ethylenically unsaturated major comonomer is ethylene.

4. The method of claim 3 wherein said minor comonomer is selected from the group consisting of acrylic acid, alkyl acrylate, methacrylic acid and alkyl methacrylate.

5. A graft polymer having carboxy terminated side chains, said graft polymer having a copolymeric backbone chain comprising a major repeating unit of the formula

wherein R is independently selected from the group consisting of hydrogen, halogen and alkyl radicals of up to 8 carbon atoms, and between 1 mol percent and 20 mol percent of the total backbone chain repeating units of a minor repeating unit of the formula

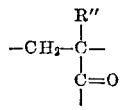

wherein R" is hydrogen or methyl, the ethylenic linkages are in the backbone chain, and the carbonyl group is attached to a polyamide graft chain of the formula

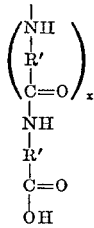

wherein $x$ is a cardinal number of at least 1 and R' is a polymethylene diradical of at least 5 methylene groups, said copolymeric backbone chain constituting between 2 and 90% by weight of the graft copolymer.

6. The graft polymer of claim 5 wherein R' has the formula $-CH_2(CH_2)_3CH_2-$.

7. The graft polymer of claim 2 wherein said major repeating unit has the formula $-CH_2-CH_2-$.

8. The graft polymer of claim 7 wherein R' has the formula $-CH_2(CH_2)_3CH_2-$.

9. A composition comprising the graft polymer of claim 5 blended with ungrafted polycaprolactam.

References Cited
UNITED STATES PATENTS

| | | | |
|---|---|---|---|
| 3,017,391 | 1/1962 | Mottus | 260—78 |
| 3,325,561 | 6/1967 | Grillo | 260—857 |
| 3,136,738 | 6/1964 | Hedrick | 260—857 |
| 3,243,477 | 5/1966 | Black | 260—857 |

MURRAY TILLMAN, *Primary Examiner.*

P. LIEBERMAN, *Assistant Examiner.*

UNITED STATES PATENT OFFICE
CERTIFICATE OF CORRECTION

Patent No. 3,388,186      Dated June 11, 1968

Inventor(s) Raymond J. Kray and Richard J. Bellet

It is certified that error appears in the above-identified patent and that said Letters Patent are hereby corrected as shown below:

At column 8, line 1 of claim 7, "claim 2" should read --claim 5-- .

SIGNED AND SEALED

OCT 21 1969

(SEAL)
Attest:

Edward M. Fletcher, Jr.
Attesting Officer

WILLIAM E. SCHUYLER, JR.
Commissioner of Patents